(12) United States Patent
Li et al.

(10) Patent No.: US 7,393,930 B2
(45) Date of Patent: *Jul. 1, 2008

(54) MODIFIED PROTEIN ADHESIVES AND LIGNOCELLULOSIC COMPOSITES MADE FROM THE ADHESIVES

(75) Inventors: Kaichang Li, Corvallis, OR (US); Yuan Liu, Corvallis, OR (US)

(73) Assignee: State of Oregon Acting By and Through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/372,998

(22) Filed: Mar. 9, 2006

(65) Prior Publication Data

US 2006/0156954 A1    Jul. 20, 2006

Related U.S. Application Data

(63) Continuation of application No. 10/437,595, filed on May 13, 2003, now Pat. No. 7,060,798.

(60) Provisional application No. 60/380,366, filed on May 13, 2002.

(51) Int. Cl.
*A23J 1/14* (2006.01)

(52) U.S. Cl. .......................... 530/378; 530/202; 493/49; 52/737.3

(58) Field of Classification Search .................. None
See application file for complete search history.

(56) References Cited

U.S. PATENT DOCUMENTS

| | | | |
|---|---|---|---|
| 2,882,250 A | 4/1959 | Baker | |
| 2,926,116 A | 2/1960 | Keim | |
| 2,926,154 A | 2/1960 | Keim | |
| 3,207,613 A | 9/1965 | Merrill | |
| 3,274,042 A * | 9/1966 | Gilboe et al. | 156/328 |
| 3,285,801 A * | 11/1966 | Sarjeant | 428/221 |
| 3,395,033 A | 7/1968 | Remer | |
| 3,494,775 A * | 2/1970 | Coscia et al. | 106/155.1 |
| 3,634,399 A | 1/1972 | Coscia et al. | |
| 4,201,851 A | 5/1980 | Chen | |
| 4,382,136 A * | 5/1983 | Blount | 527/305 |
| 4,421,824 A | 12/1983 | Gupta et al. | |
| 4,474,694 A * | 10/1984 | Coco et al. | 530/407 |
| 4,675,351 A | 6/1987 | Brown | |
| 5,017,675 A | 5/1991 | Marten et al. | |
| 5,021,531 A | 6/1991 | Schroeder | |
| 5,026,808 A | 6/1991 | Schroeder | |
| 5,374,670 A * | 12/1994 | Ayorinde et al. | 524/13 |
| 5,708,059 A | 1/1998 | Pfeil et al. | |
| 6,030,562 A * | 2/2000 | Lehtinen et al. | 264/83 |
| 6,124,032 A * | 9/2000 | Bloch et al. | 428/346 |
| 6,217,976 B1 | 4/2001 | Macpherson et al. | |
| 6,258,920 B1 | 7/2001 | Starner et al. | |
| 6,277,481 B1 * | 8/2001 | Sugino et al. | 428/317.1 |
| 6,306,997 B1 | 10/2001 | Kuo et al. | |
| 6,339,116 B1 | 1/2002 | Afzali-Ardakani et al. | |
| 6,368,529 B1 * | 4/2002 | Lloyd et al. | 264/109 |
| 6,395,356 B1 | 5/2002 | Wielockx et al. | |
| 6,406,530 B1 | 6/2002 | Bengs et al. | |
| 6,716,421 B2 * | 4/2004 | Brode et al. | 424/84 |
| 7,060,798 B2 * | 6/2006 | Li et al. | 530/378 |
| 2001/0014399 A1 | 8/2001 | Jasne | |
| 2002/0005251 A1 | 1/2002 | Sun et al. | |
| 2002/0026025 A1 | 2/2002 | Kuo et al. | |
| 2004/0037906 A1 | 2/2004 | Li et al. | |
| 2004/0089418 A1 * | 5/2004 | Li | 156/296 |
| 2004/0220368 A1 | 11/2004 | Li et al. | |
| 2005/0261404 A1 | 11/2005 | Rivers et al. | |
| 2005/0282988 A1 | 12/2005 | Li | |

FOREIGN PATENT DOCUMENTS

| | | |
|---|---|---|
| DE | 198 43 493 | 3/2000 |
| DE | 198 43 493 | 3/2003 |
| EP | 0 199 171 A2 | 7/1986 |
| EP | 0 969 056 A1 | 1/2000 |
| EP | 0 878 133 B1 | 12/2001 |
| WO | WO 00/08110 | 2/2000 |

OTHER PUBLICATIONS

Li et al., *Investigation of New Formaldehyde-Free Wood Adhesive Systems Consisting of Biopolymers and an Aqueous Curing Agent* (Abstract), Forest Products Society 57th Annual Meeting, Bellevue, Washington, Jun. 22-25, 2003.

(Continued)

*Primary Examiner*—Anish Gupta
*Assistant Examiner*—Satyanarayana R. Gudibande
(74) *Attorney, Agent, or Firm*—Klarquist Sparkman, LLP (57) ABSTRACT

An adhesive composition made by reacting a soy protein with at least one compound under conditions sufficient for introducing additional phenolic hydroxyl functional groups, amine functional groups, and/or thiol functional groups into the soy protein structure.

35 Claims, 4 Drawing Sheets

OTHER PUBLICATIONS

DuPont Protein Technologies, Soy Protein Forms, http://www.proteintechnologies.com/corp_eng.nsh/pages/Soy-3, 2002.

Georgia-Pacific Chemical Products, Wet and Dry Strength Resins, http://www.gp.com/chemical/products.asp, 2002.

Hercules Incorporated, Material Safety Data Sheet, hhtp://msds.plaza.herc.com/msds/00223300.html.

Hercules Incorporated, Kymene 557H Wet-Strength Resin Product Data Sheet, 1999.

Li et al., "Development of formaldehyde-free wood adhesives from brown-rot-fungus-degraded wood—Cell 38," *Advances in Biodegradation and Biotransformation of Lignocellulosics*, The 225$^{th}$ ACS National Meeting, New Orleans, LA, Mar. 24, 2003.

Li et al., "Novel wood adhesive based on tannin and polyethyleneimine," *Composites from Renewable Resources*, The 225$^{th}$ ACS National Meeting, New Orleans, LA, Mar. 26, 2003.

Liu et al., "Chemical Modification of Soy Protein for Wood Adhesives," *Macromol. Rapid Commun.* 23(13):739-742, 2002.

Yu et al., "Synthetic Polypeptides Mimics of Marine Adhesives," *Macromolecules* 31(15):4739-4745, 1998.

Yu et al., "Role of $_L$-3,4-Dihydroxyphenylalanine in Mussel Adhesive Proteins," *J. Am. Chem. Soc.* 121(24):5825-5826, 1999.

PCT/US2004/012307 International Search Report (mailed Dec. 29, 2004).

PCT/US2005/001981 International Search Report (mailed Nov. 9, 2005).

Yu et al., *Macromolecules* 31:4739-4745, 1998.

Yu et al., *J. Am. Chem. Soc.* 121:5825-5826, 1999.

DuPont Protein Technologies, Soy Protein Forms, http://www.proteintechnologies.com/corp_eng.nsh/pages/Soy-3, 2002.

Georgia-Pacific Chemical Products, Wet and Dry Strength Resins, http://www.gp.com/chemical/products.asp, 2002.

Hercules Incorporated, Material Safety Data Sheet, http://msds.plaza.herc.com/msds/00223300.html.

Hercules Incorporated, Kymene 557H Wet-Strength Resin Product Data Sheet, 1999.

Li et al., *Advances in Biodegredation and Biotransformation of Lignocellulosics*, The 225th ACS National Meeting, New Orleans, LA, Mar. 24, 2003.

Li et al., *Compositves from Renewable Resources*, The 225th ACS National Meeting, New Orleans, LA, Mar. 26, 2003.

Liu et al., *Macromol. Rapid Commun* 23(13):739-742, 2002.

PCT/US2004/012307 International Search Report (mailed Dec. 29, 2004).

Li et al., *Advances in Biodegredation and Biotransformation of Lignocellulosics*, The 225th ACS National Meeting, New Orleans, LA, Mar. 24, 2003.

Li et al., *Composites from Renewable Resources*, The 225th ACS National Meeting, New Orleans, LA, Mar. 26, 2003.

Li et al., *Investigation of New Formaldehyde-Free Wood Adhesive Systems Consisting of Biopolymers and an Aqueous Curing Agent* (Abstract), Forest Products Society 57$^{th}$ Annual Meeting, Bellevue, WA, Jun. 22-25, 2003.

Liu et al., *Macromol. Rapid Commun.* 23(13):739-742, 2002.

Final Office Action dated Jun. 22, 2006, from related U.S. Appl. No. 10/438,147.

Final Office Action dated May 2, 2006, from related U.S. Appl. No. 10/802,500.

Brown, "Better Bonding with Beans," *Environmental Health Perspectives* 113(8):A538-A541, 2005.

Columbia Forest Products, "A Breath of Fresh Thinking Purebond™," http://www.columbiaforestproducts.com/products/prodpb/aspx, downloaded Aug. 20, 2006.

Columbia Forest Products, "Columbia Forest Products Launches a Revolution in Plywood Adhesives," *Environmental Building News* 14(6):9, 2005.

Evertz, "Bonding with the Industry," http://www.adhesivesmag.com/CDA/Articles/Feature_Article/df86b2419220c010VgnVC, downloaded Jul. 28, 2006.

Georgia-Pacific Resins, Inc. Product Data Sheet, "Paper Chemicals. The Entire spectrum of Performance Paper Chemicals from Georgia Pacific," 1998.

Hampel et al., Glossary of Chemical Terms (2d ed.), Van Nostrand Reinhold Company, p. 254, 1982.

Hercules Product Data Sheet, "KYMENE® 557H Wet-Strength Resin. Insolubilizing Agent for Water-Soluble Polymers and Gums," 1999.

Hercules Material Safety Data Sheet, "REZOSOl® 9223 Creping Aid," 2003.

Hawley's Condensed Chemical Dictionary (13$^{th}$ ed.), John Wiley & Sons, Inc., p. 964,1997.

Metafore, "Metafore announces recipients of inaugural Innovations Award," www.metaforce.org, 2006.

RisMedia, "Top Green Building Products of 2006 Selected by Editors of Sustainable Industries Journal," http://rismedia.com/index.php.article/articleview/15478/1/1, downloaded Aug. 21, 2006.

Office Action dated Nov. 13, 2006, from U.S. Appl. No. 10/438,147, filed May 13, 2003.

* cited by examiner

MODIFIED PROTEIN ADHESIVES AND LIGNOCELLULOSIC COMPOSITES MADE FROM THE ADHESIVES

PRIORITY

This application is a continuation of U.S. patent application Ser. No. 10/437,595, filed May 13, 2003, now U.S. Pat. No. 7,060,798 which claims the benefit of U.S. Provisional Application 60/380,366, filed May 13, 2002, both of which are incorporated herein by reference in their entireties.

STATEMENT OF GOVERNMENT SUPPORT

This invention was made with United States Government support under Contract USDA/CSREES 2001-35504-10993 awarded by the United States Department of Agriculture. The United States Government has certain rights in the invention.

FIELD

The present disclosure relates to adhesives and lignocellulosic composites made from the adhesives.

BACKGROUND

Lignocellulosic-based composites are formed from small dimension pieces of cellulosic material that are bonded with an adhesive (i.e., a binder). In general, solid wood is fragmented into smaller pieces such as strands, fibers, and chips. An adhesive composition then is added to the wood component. The resulting mixture is subjected to heat and pressure resulting in a composite. The adhesive mix typically is the only non-lignocellulosic component.

The most commonly used wood adhesives are phenol-formaldehyde resins (PF) and urea-formaldehyde resins (UF). There are at least two concerns with PF and UF resins. First, volatile organic compounds (VOC) are generated during the manufacture and use of lignocellulosic-based composites. An increasing concern about the effect of emissive VOC, especially formaldehyde, on human health has prompted a need for more environmentally acceptable adhesives. Second, PF and UF resins are made from petroleum-derived products. The reserves of petroleum are naturally limited. The wood composite industry would greatly benefit from the development of formaldehyde-free adhesives made from renewable natural resources.

Soy protein was used as a wood adhesive for the production of plywood from the 1930's to the 1960's. Petroleum-derived adhesives replaced soy protein adhesives due to the relatively low bonding strength and water resistance of soy protein adhesives. However, soy protein is an inexpensive, abundant, renewable material that is environmentally acceptable.

SUMMARY OF THE DISCLOSURE

Disclosed herein are adhesive compositions made by reacting a protein with at least one compound under conditions sufficient for introducing additional phenolic functional groups, amine functional groups, and/or thiol functional groups into the protein structure.

One example of an adhesive composition disclosed herein includes a reaction product of soy protein with at least one compound under conditions sufficient for introducing additional phenolic hydroxyl, amino, imino and/or thiol functional groups into the soy protein structure. The additional functional groups typically are present in terminal, pendant, or terminal and pendant positions in the soy protein structure.

A further example of an adhesive composition disclosed herein includes a reaction product of soy protein and at least one compound, wherein the compound includes (i) at least one first functional group selected from phenolic hydroxyl, thiol, amino, and imino, and (ii) at least one second functional group for covalently bonding the compound to the soy protein.

In a first, more specific approach, the adhesive composition includes a reaction product of protein and a compound, wherein the compound includes (i) at least one first functional group selected from phenolic hydroxyl and thiol and (ii) at least one amino functional group, and the amino functional group of the compound covalently bonds to a carboxylic acid functional group of the protein.

In a second, more specific approach, the adhesive composition includes modified protein made by initially reacting protein and a first compound that includes at least one nitrogen-containing functional group under conditions sufficient for covalently bonding the nitrogen-containing functional group with a functional group of the protein resulting in an amine-augmented protein. The amine-augmented protein then is reacted with at least one phenolic compound under conditions sufficient for covalently bonding the phenolic compound to the amine-augmented protein to produce the modified protein adhesive.

In a third, more specific approach, the adhesive composition includes a modified protein made by initially reacting protein and a phenolic or thiol compound under conditions sufficient for forming at least one ether, ester or amide linkage between the phenolic or thiol compound and the protein resulting in a thiol- or phenolic hydroxyl-augmented protein. The thiol- or phenolic hydroxyl-augmented protein then is reacted with a compound that includes at least one nitrogen-containing functional group under conditions sufficient for covalently bonding at least one amino functional group to the thiol- or phenolic hydroxyl-augmented protein.

Also disclosed herein are methods for making lignocellulosic composites from the adhesive compositions and the resulting composites.

BRIEF DESCRIPTION OF THE DRAWINGS

Certain embodiments will be described in more detail with reference to the following drawing.

DETAILED DESCRIPTION OF SEVERAL EMBODIMENTS

The presently disclosed adhesives may be made by modifying a protein to increase the number of phenolic hydroxyl groups, amino or imino, and/or thiol (i.e., mercapto) functional groups existing in the protein structure. In other words, the resulting modified protein structure (i.e., the protein residue) includes an additional number of covalently bonded phenolic hydroxyl groups, amino or imino, and/or thiol functional groups beyond those already existing in the unmodified protein structure. In particular, the additional phenolic hydroxyl groups, amino or imino, and/or thiol groups are introduced in terminal and/or pendant positions in the protein residue structure. As a result of their terminal and/or pendant position, the additional phenolic hydroxyl groups, amino, imino, or thiol groups are free for substrate adhesive bonding and crosslinking when the adhesive composition is heated as described below. These additional free functional groups typically are covalently bonded to the protein structure via linking groups such as amides, ethers, or esters.

The modified protein structure may include one or more types of additional free functional groups. For example, the modified protein structure may include only phenolic hydroxyl, amino or thiol groups. However, according to another embodiment, the modified protein structure may include additional phenolic hydroxyl groups and amino groups. In an additional variant, the modified protein structure may include additional thiol groups and phenolic hydroxyl groups. In a further variant, the modified protein structure may include additional phenolic hydroxyl groups, thiol groups, and amino groups.

According to particular examples of the adhesive, the protein may be modified to incorporate about 0.1 weight percent to about 30 weight percent additional phenolic compounds, about 0.1 weight percent to about 30 weight percent additional amine compounds, and/or about 0.1 weight percent to about 30 weight percent thiol compounds, based on the total weight of the modified protein. The inventors have found that augmenting the number of amine, phenolic groups, and/or thiol groups in a protein structure provides an adhesive having superior adhesive strength and water resistance.

The protein undergoing modification typically is any protein that is readily available from a renewable source. Examples of such proteins include soy protein, keratin, gelatin, collagen, gluten, and casein. The protein may have been pretreated to obtain a material that is soluble or dispersible in water as is known in the art.

Soy protein is an exemplary protein for use in the presently described adhesives. Soybeans contain about 38 weight percent protein with the remaining portion comprising carbohydrates, oils and moisture. Soybeans are processed to increase the amount of soy protein in the processed product. Soy protein products of any form may be utilized in the disclosed adhesive compositions. The three most common soy protein products are soy flour, soy protein concentrate, and soy protein isolate (SPI). One difference between these products is the amount of soy protein. Soy flour includes approximately 50 weight percent protein, soy protein concentrate includes at least about 65 weight percent protein (dry weight), and SPI includes at least about 85 weight percent protein (dry weight). According to certain embodiments of the adhesive composition, the soy protein is SPI.

The protein may be prepared for use in the adhesive compositions in any manner. Typically, the protein is included in a carrier or delivery liquid such as water or similar solvent. In particular, the protein may be dissolved in water and the resulting aqueous solution mixed with the modifying reactant(s) described above. The aqueous adhesive solution may be prepared, for example, by initially mixing the protein in water and adjusting the pH of the mixture to the desired range. When the protein is mixed with the modifying reactant(s), the pH of the protein part may be acidic or alkaline. For example, the pH of the protein part may be about 5 to about 8 for the reaction of the protein with an amine compound. However, when the modified protein is used as a wood adhesive, the pH value should be between about 4.5 to about 11. The pH may be adjusted by adding basic substances such as, for example, alkali hydroxides, or by adding acidic substances such as inorganic acids or organic acids. The amount of protein dissolved in the water may be adjusted to provide the desired solids content for the adhesive composition. The protein solids content may be, for example, from about 10 to about 60 weight percent. The protein solution may be freeze-dried at this stage of formulation or it may remain as a liquid solution. If the protein solution is freeze-dried, water (or the appropriate carrier fluid) is simply added to the freeze-dried substance prior to use. Freeze-drying will reduce the cost of transporting the adhesive.

There are a number of synthesis variations for modifying the protein to increase the number of phenolic hydroxyl groups, amino or imino functional groups, and/or thiol functional groups. In a first variant, the protein may be reacted with a multifunctional compound that includes (i) a first functional group selected from a phenolic hydroxyl, a thiol, or an amino and (ii) a second functional group that can form a covalent bond with the protein. The second functional group may be an amino, carboxyl, hydroxyl, or similar protein-reactive group. In examples of the first variant, the protein may be reacted with a multifunctional compound that includes both phenolic hydroxyl and amino functional groups (or both thiol and amino functional groups) that can be introduced into the protein structure. The amino functional groups react with the carboxyl functional groups of the protein to form amide linking groups. In a second variant, the protein may be initially reacted with a nitrogen-donating compound for producing an amine-augmented protein that is subsequently reacted with a phenolic hydroxyl-donating compound for producing the final modified protein adhesive. In a third variant, the protein may be initially reacted with a phenolic hydroxyl-donating compound for producing a phenolic hydroxyl-augmented protein that is subsequently reacted with a thiol- or nitrogen-donating compound for producing the final modified protein adhesive. Each synthesis variant will be described below in more detail. In all of the variants, all of the reactants may be in the form of aqueous solutions or dispersions. Thus, volatile organic solvents as carrier fluids can be avoided.

With reference to the first variant, illustrative multifunctional compounds for reacting with the protein to introduce free phenolic hydroxyl groups include dopamine (i.e., 3,4-dihydroxyphenylethylamine hydrochloride), tyramine (4-hydroxyphenylethylamine hydrochloride), DOPA (3,4-dihydroxyphenyl-L-alanine), 2-aminophenol, 3-aminophenol, and 4-aminophenol. Illustrative multifunctional compounds for reacting with the protein to introduce free thiol groups include cysteamine, cysteine, glutathione, five-membered dithiocarbonates (i.e., compounds with the basic structure of 1,3-oxathiolane-2-thione), γ-thiobutyrolactone, mercaptoacetic acid, 2-mercaptoethanol, 3-mercaptopropionic acid, and (3-mercaptopropyl)trimethoxysilane. Illustrative multifunctional compounds for reacting with the protein to introduce free amino groups include alkyl amines (e.g., 1,3-diaminopropane, 1,6-hexanediamine, ethylene diamine, diethylenetriamine), unsaturated hydrocarbon amines (e.g., allylamine), hydroxy amines (e.g.,ethanolamine, hydroxyamine), amidines (e.g., melamine), imines (e.g., polyethyleneimine), amino acids (e.g., 4-aminobutyric acid, 6-aminocaprioc acid), polyamines, polyamides, and mixtures thereof. In the case of the diamines, triamines or polyamines, one or more, but not all, of the amino groups may form the covalent bond with the protein. The amino group(s) that do not covalently bond with the protein then are available to serve as the free functional group for adhesive bonding purposes.

The multifunctional compounds may be reacted with the protein via a chemical process that includes blocking certain phenolic hydroxyl groups, thiol groups and/or amino groups of the multifunctional compounds. Alternatively, the multifunctional compounds may be reacted with a protein in a one-step enzymatic process that does not require blocking of phenolic hydroxyl groups, thiol groups and/or amino groups of the multifunctional compounds.

With respect to the chemical process, the phenolic hydroxyl groups, thiol groups and/or amino groups whose reaction with the protein during the protein modification is undesirable would be initially protected with a group that is non-reactive with functional groups of the protein. Such protection processes may include the formation of ethers, esters, amides, or thiol-esters. The protein then is reacted with the selectively protected multifunctional compound under conditions sufficient for forming a covalent bond between a functional group of the protein (typically a carboxylic acid, amino, hydroxyl or thio functional group) and an amino group or carboxylic acid group of the multifunctional compound. The conditions for this reaction may vary depending upon the protein and multifunctional compound but, in general, the reaction may occur at about 4 to about 200° C. In addition, there may be additives or catalysts involved in this reaction such as carboxylic-acid-activating agents (e.g., 1-(3-dimethylaminopropyl)-3-ethylcarbodiimide hydrochloride (EDC), transglutaminase, and lipase). Finally, the remaining protected phenolic hydroxyl groups, thiol groups and/or amino groups of the modified protein are deprotected by reaction with acids such as HBr, acetic acid, trifluoracetic acid, sulfuric acid, and HCl or with an alkali such as sodium hydroxide. The conditions for the unblocking reaction may vary depending upon the protein and unblocking reactant but, in general, the reaction may occur at about 20 to about 150° C.

With respect to the enzymatic process, the multifunctional compound, the protein and an enzyme catalyst may be mixed together. The enzyme catalyzes the formation of an amide or an ester covalent bond between a carboxylic acid group of the protein and an amino group/hydroxyl group of the multifunctional compound or between an amino group/hydroxyl group of the protein and a carboxylic acid of the multifunctional compound. Illustrative enzyme catalysts include transglutaminases and lipases. The conditions for the catalyzed enzymatic reaction may vary depending upon the protein, enzyme, and multifunctional compound but, in general, the reaction may occur at about 4 to about 70° C. The pH value should be at about 3 to about 9.

The second variant involves reacting the protein with a nitrogen-donating compound under conditions sufficient for covalently bonding at least one amino group to the protein structure. According to illustrative examples, the nitrogen-donating compound reacts with the carboxylic acid groups of the protein. The reaction conditions may vary depending upon the particular protein and nitrogen-donating compound, but in general the reaction temperature may range from about 4 to about 200° C. Additives or catalysts that may be involved in this reaction include carboxylic-acid-activating agents such as 1-(3-dimethylaminopropyl)-3-ethylcarbodiimide hydrochloride (EDC), transglutaminase, and lipase.

Suitable nitrogen-donating compounds include compounds that contain at least one amino or imino group. Illustrative nitrogen-donating compounds include alkyl amines (e.g., 1,3-diaminopropane, 1,6-hexanediamine, ethylene diamine, diethylenetriamine), unsaturated hydrocarbon amines (e.g., allylamine), hydroxy amines (e.g., ethanolamine, hydroxyamine), amidines (e.g., melamine), imines (e.g., polyethyleneimine), amino acids (e.g., 4-aminobutyric acid, 6-aminocaprioc acid), polyamines, polyamides, and mixtures thereof. The nitrogen-donating compound may be water-soluble or water-dispersible.

The phenolic hydroxyl-donating compound may react with the amine-augmented protein by various synthetic approaches. For example, via oxidation intermediates (e.g., quinones and aromatic rings) of phenolic hydroxyl groups of the phenolic-donating compound reacting with amino functional group of the amine-augmented protein. Illustrative phenolic-donating compounds include dopamine, DOPA (3,4-dihydroxyphenylalanine); caffeic acid; catechol; 4-methylcatechol; 4-hydroxycinnamic acid; 4-hydroxy-3-methoxycinnamic acid; 4-hydroxy-3,5-dimethoxycinnamic acid; tannin; flavonoids; lignin; and poly(4-vinylphenol). The conditions for the reaction may vary depending upon the protein and phenolic hydroxyl-donating compound but, in general, the reaction may occur during the pressing of wood composites at about 100 to about 200° C. for about 0.5 to about 10 minutes. The amine-augmented protein can also be used as one part of a two-part adhesive system in which the second part is the phenolic hydroxyl-donating compound.

With respect to the third variant, the protein is initially reacted with a phenolic hydroxyl-donating compound under the conditions described above. The phenolic hydroxyl-augmented protein then is reacted with a thiol-donating or nitrogen-donating compound under the conditions described above. Illustrative thiol-donating compounds include cysteamine, cysteine, glutathione, five-membered dithiocarbonates (i.e., compounds with the basic structure of 1,3-oxathiolane-2-thione), γ-thiobutyrolactone, mercaptoacetic acid, 2-mercaptoethanol, 3-mercaptopropionic acid, and (3-mercaptopropyl)trimethoxysilane. The phenolic hydroxyl-augmented protein can also be used as one part of a two-part adhesive system in which the second part is the nitrogen-donating compound or thiol-donating compound.

According to particular embodiments, the phenolic compound that is covalently bonded to the protein includes two phenolic hydroxyl groups in an ortho position relative to each other on the aromatic ring. Two phenolic hydroxyl groups should provide superior bonding strength. If only one phenolic hydroxyl group is present, an enzyme such as phenoloxidative enzymes such as laccases, polyphenoloxidases or tyrosinases may be added as a curing agent.

The adhesive composition may also include additives and fillers found in lignocellulosic adhesives such as bactericides, insecticides, silica, wheat flour, tree bark flour, nut shell flour and the like.

The adhesive compositions are heat-curable. Such curing typically occurs during the hot pressing step of the lignocellulosic composite formation. Thus, the cure temperature of the adhesive composition is tailored so that it coincides with the heating temperatures used in composite formation. Such cure temperatures may range, for example, from about 100 to about 200° C., more particularly from about 120 to about 170° C.

Lignocellulosic composites that can be produced with the adhesives described herein include particleboard, oriented strand board (OSB), waferboard, fiberboard (including medium-density and high-density fiberboard), parallel strand lumber (PSL), laminated strand lumber (LSL), and similar products. In general, these composites are made by first blending comminuted lignocellulosic materials with an adhesive that serves as a binder that adheres the comminuted lignocellulosic materials into a unitary densified mass. Examples of suitable lignocellulosic materials include wood, straw (including rice, wheat and barley), flax, hemp and bagasse. The comminuted lignocellulosic materials can be in any processed form such as chips, flakes, fibers, strands, wafers, trim, shavings, sawdust, straw, stalks and shives. The resultant mixture is formed into the desired configuration such as a mat, and then processed, usually under pressure and with heat, into the final product. Processes are generally carried out at temperatures of from about 120 to 225° C. in the presence of varying amounts of steam, generated by liberation of entrained moisture from the lignocellulose materials. Thus, the moisture content of the lignocellulose material may be between about 2 and about 20 percent by weight, before it is blended with the adhesive.

The amount of adhesive mixed with the lignocellulosic particles may vary depending, for example, upon the desired composite type, lignocellulosic material type and amount of, and particular type of, adhesive composition. In general, about 1 to about 12, more particularly about 3 to about 10, weight percent adhesive may be mixed with the lignocellulosic material, based on the total combined weight of adhesive and lignocellulosic material. The mixed adhesive composition may be added to the comminuted lignocellulosic particles by spraying or similar techniques while the lignocellulosic particles are tumbled or agitated in a blender or similar mixer. For example, a stream of the comminuted lignocellulosic particles may be intermixed with a stream of the mixed adhesive composition and then be subjected to mechanical agitation.

The adhesive compositions also may be used to produce plywood, hardboard or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

The presently disclosed adhesive provides a strong bond between the lignocellulosic particles or fractions. The adhesive also provides structural composites with high mechanical strength. In addition, the adhesive composition is substantially free of formaldehyde (including any compounds that may degenerate to form formaldehyde). For example, the adhesive compositions do not contain any formaldehyde (and formaldehyde-generating compounds) that is detectable by conventional methods or, alternatively, the amount of formaldehyde (and formaldehyde-generating compounds) is negligible from an environmental and workplace regulatory standpoint.

The specific examples described below are for illustrative purposes and should not be considered as limiting the scope of the appended claims.

EXAMPLE 1

Preparation of Alkali-Modified Soy Protein Isolate

SPI powder (10 g) was mixed with 140 ml of distilled water at room temperature and then stirred for 120 minutes. The pH value of the mixture was then adjusted to 10 using sodium hydroxide (1 M). The mixture was subsequently mixed in a shaker at 50° C. and 180 rpm for 120 minutes. The insoluble portion was removed through filtration and the aqueous SPI solution was freeze-dried.

EXAMPLE 2

Preparation of Phenolic hydroxyl-augmented SPI-dopamine

Figure 1:
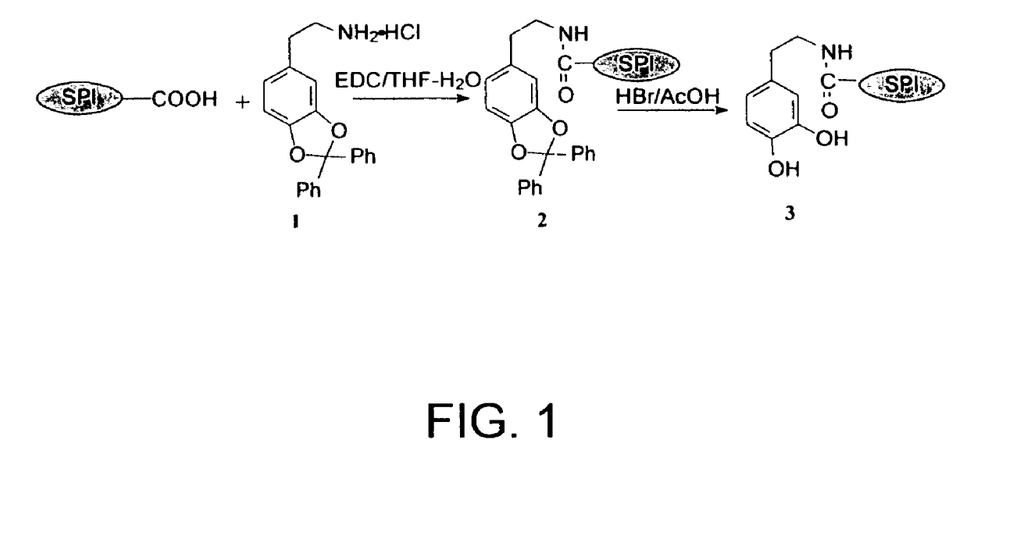
FIG. 1 shows a synthesis scheme for producing an example of the presently described adhesive.

A reaction synthesis for preparing a phenolic hydroxyl-augmented SPI-dopamine is shown in FIG. 1. A mixture of dopamine (DA) (1.0 g) and dichlorodiphenyl methane (3.16 g) was slowly stirred at 190° C. After the reaction started, as evidenced by rigorous gas evolution, the reaction mixture was stirred rapidly at 190° C. for 6 minutes. The mixture was cooled to room temperature and then washed by diethyl ether. The product ((1)-O,O'-diphenylmethyl-dopamine hydrochloride) was crystallized from methanol and ethyl acetate (1.36 g, 73 percent).

To a suspension of the alkaline SPI of Example 1 (1.0 g) in 40 ml of tetrahydrofuran (THF)-$H_2O$ (1:1, v/v) was added a solution of compound 1 (2.07 g) in THF-$H_2O$ (1:1, v/v) (20 ml). The resulting mixture was adjusted to a pH value of 5.5. A solution of 1-(3-dimethylaminopropyl)-3-ethylcarbodiimide hydrochloride (EDC) (1.8 g) and THF-H2O (1:1, v/v) (20 ml) was added to the reaction mixture dropwise in 1 hour while maintaining the pH value at 5.5. The reaction mixture was stirred overnight and then centrifuged. The precipitate 2 was collected and washed with EtOAc (2 times) and deionized water (2 times).

To a solution of the protected SPI-DA (compound 2) (1.0 g) in TFA (10 ml) was added 33 percent HBr-AcOH (10 ml) with stirring. The mixture was stirred for 1 hour at room temperature. The deprotected SPI-DA (compound 3) was precipitated by addition of diethyl ether, washed extensively with water-ethanol (1:4, v/v), and then freeze-dried.

The amount of dopamine in the dopamine-modified SPI was determined as explained below. The protected SPI-DA (20 mg) was hydrolyzed in 4 ml of 6N HCl solution for 24 hours at 110° C. The hydrolyzed product was diluted with deionized water to 100 ml. To 1.0 ml of the diluted solution was added water (1.0 ml), sodium nitrite-sodium molybdate stock solution ($NaNO_2$, 100 g and $Na_2MoO_4$, 100 g in 1.0 liter of deionized water) (1.0 ml), and 1N sodium hydroxide (1.0 ml). Absorbance of the resulting solution was measured at 500 nm, and corrected by a control (Protected SPI-DA was replaced with the alkaline SPI in the above procedure). The concentration of dopamine was then determined by use of a dopamine standard curve. The dopamine standard curve was obtained as follows: an aqueous dopamine solution (1.0 ml) with predetermined concentration of dopamine was mixed with water (1.0 ml), the sodium nitrite-sodium molybdate stock solution (1.0 ml), and 1N sodium hydroxide (1.0 ml). Absorbance of the resulting solution was read at 500 nm. The linear relationship between the absorbance and the concentration of dopamine was used to construct a dopamine standard curve.

EXAMPLE 3

Preparation and Testing Wood Composites

A solution of water and the modified SPI of Example 2 (6:1 wt. ratio) was applied to one surface of a maple veneer strip (100×60 mm, 0.6 mm thick). About 2.5 mg modified SPI was applied to the maple veneer. The bonding area was 2×2.5 cm. Two pieces of maple veneer strips were stacked together and hot-pressed at 120° C. for 10 minutes. The applied pressure was 20 kg/cm$^2$.

Lap-shear strengths of the resulting wood assembly specimens were tested using an Instron TTBML testing machine with a crosshead speed of 1.0 mm/minute. The maximum shear strength at breakage was recorded. In water resistance testing, the specimens were soaked in water at room temperature for 24 hours then dried at room temperature in a fume hood for 24 hours and the shear strengths of the specimens were measured. The soaking-and-drying cycle was repeated and the shear strengths were measured after each soaking-and-drying cycle.

Figure 2:
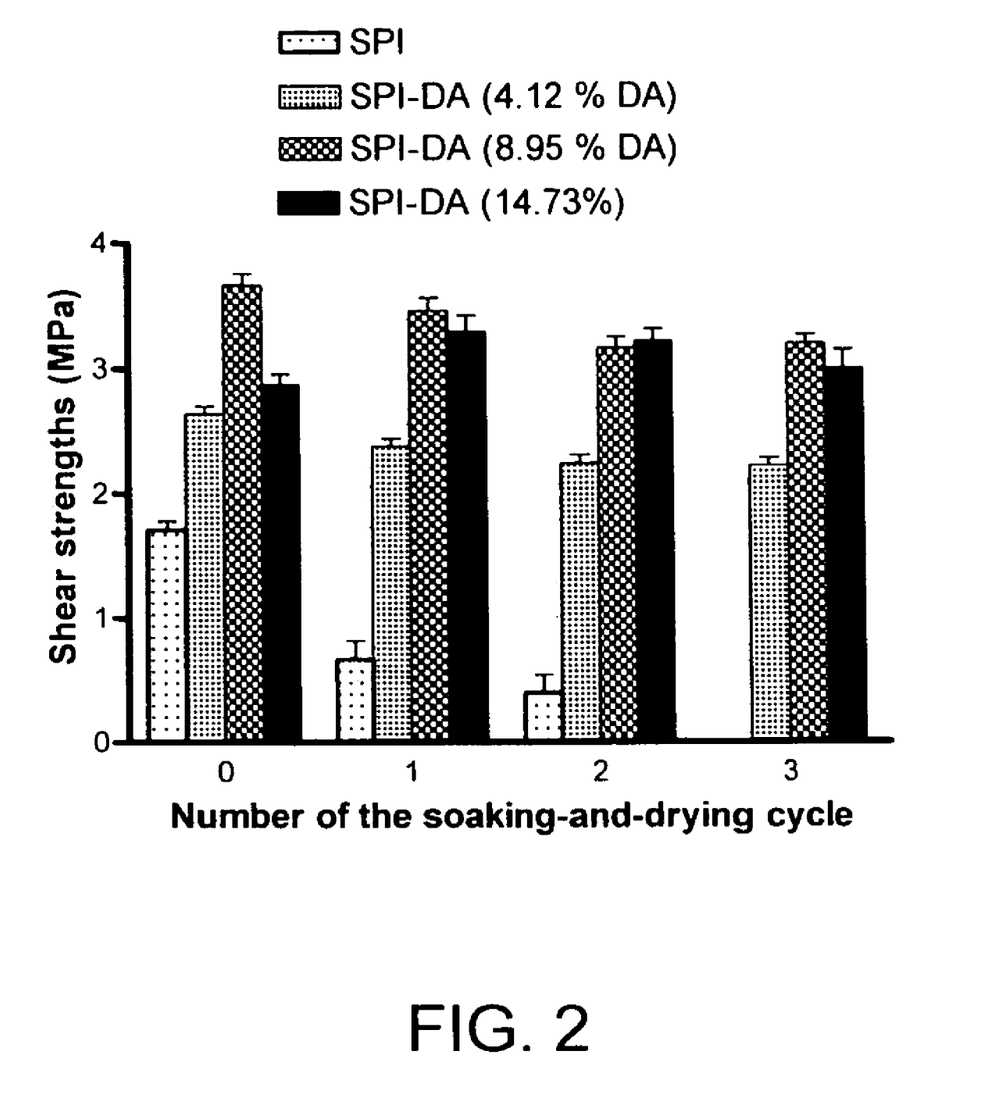
FIG. 2 is a graph depicting the lap-shear strength of examples of the presently described adhesives and a comparative example.
Figure 3:
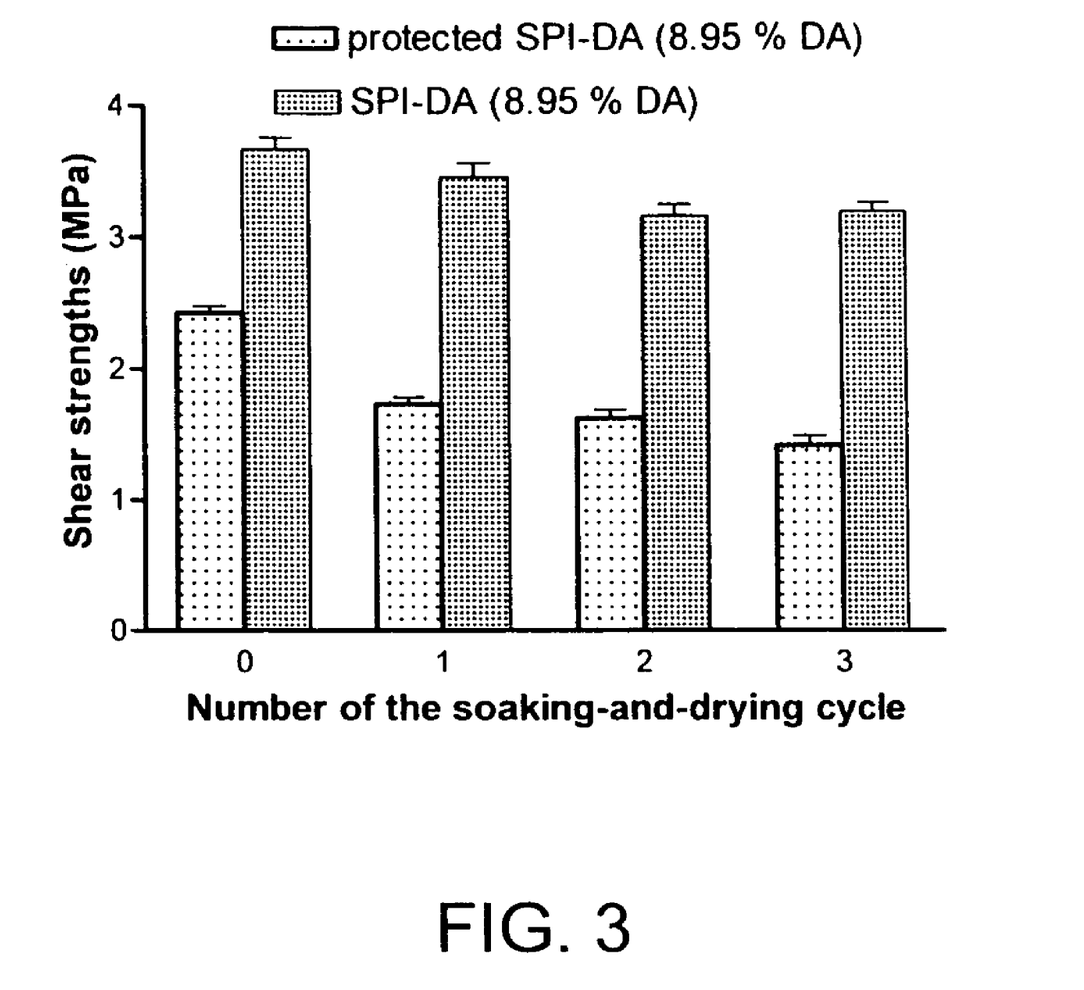
FIG. 3 is a graph depicting the lap-shear strength of an example of the presently described adhesives and a comparative example.

The lap-shear strength results are shown in FIGS. 2 and 3. The amount of dopamine grafted to the SPI was varied by changing the amount of compound 1 and EDC. As shown in FIG. 2 grafting of the dopamine (DA) to the SPI greatly increased the shear strength compared to an ungrafted alkali-SPI. Even after three soaking-and-drying cycles, the shear strengths of the wood specimens bonded with SPI-DA did not decrease. As a matter of fact, the shear strengths of specimens bonded with SPI-DA with a DA content of 14.73 weight percent increased after the first soaking-and-drying cycle. When the DA content increased from 4.12 weight percent to 8.95 weight percent, the shear strengths increased significantly. However, the shear strengths decreased when the DA content increased from 8.95 weight percent to 14.73 weight percent. The increase in the shear strengths was due to the phenolic hydroxy groups in DA. FIG. 3 demonstrates the difference in shear strength between protected SPI-DA (referred to as compound 2 in FIG. 1) and the unblocked SPI-DA (referred to as compound 3 in FIG. 1).

EXAMPLE 4

Synthesis of S-acetyl cysteamine

The thiol groups of cysteamine were blocked according to the following procedure. Acetyl chloride (10 mL) was added dropwise to a solution of cysteamine hydrochloride (2 g) and trifluoroacetic acid (10 ml). The reaction mixture was stirred under room temperature for 1 hour. The product precipitated out by adding ethyl ether. The precipitate was crystallized in methanol-ethyl ether to give pure S-acetyl cysteamine ("ACA").

EXAMPLE 5

Preparation of Thiol-augmented SPI

Figure 4:
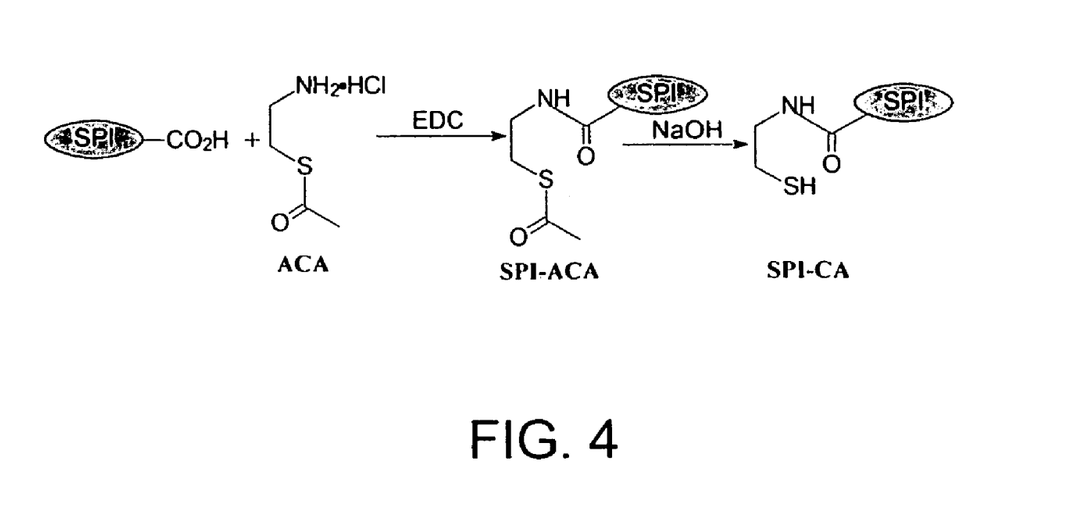
FIG. 4 shows a synthesis scheme for producing a further example of the presently described adhesive.

A reaction synthesis for preparing a thiol-augmented SPI is shown in FIG. 4. A solution of ACA (3.36 g, 21.47 mmol) and THF/H$_2$O (1:1, v/v; 100 mL) was added to a suspension of the alkaline SPI of Example 1 (5.00 g) in 200 ml of THF/H$_2$O (1:1, V/V). The pH value of the resulting mixture was adjusted to 5.5. A solution of EDC (9 g, 46.9 mmol) and THF/H$_2$O (1:1, V/V; 100 ml) was added dropwise to the reaction mixture in 1 hour while maintaining the pH value at 5.5. The reaction mixture was stirred overnight and then centrifuged. The precipitate was collected and washed with ethyl acetate (2 times) and deionized water (2 times) and then freeze-dried. Several different modified SPI-ACAs were produced under the reaction conditions shown below in Table 1.

TABLE 1

| Modified SPIs | SPI | ACA | EDC |
|---|---|---|---|
| A1 | 5 g | 0.84 g (5.37 mmol) | 2.25 g (11.74 mmol) |
| A2 | 5 g | 1.68 g (10.73 mmol) | 4.50 g (23.47 mmol) |
| A3 | 5 g | 3.36 g (21.46 mmol) | 9.00 g (46.95 mmol) |

In order to de-protect the thiol groups, a 0.2 N NaOH solution (100 mL) was bubbled with a nitrogen stream for 15 min. SPI-ACA (2.0 g) was added in the NaOH solution and stirred for 1 hour. The resulting mixture was neutralized by HCl to pH 7 and ultrafiltrated with a membrane (10,000 kDa molecular weight cutoff) under an atmosphere of nitrogen. The SPI-CA was freeze-dried.

EXAMPLE 6

Preparation and Testing Wood Composites

Figure 5:
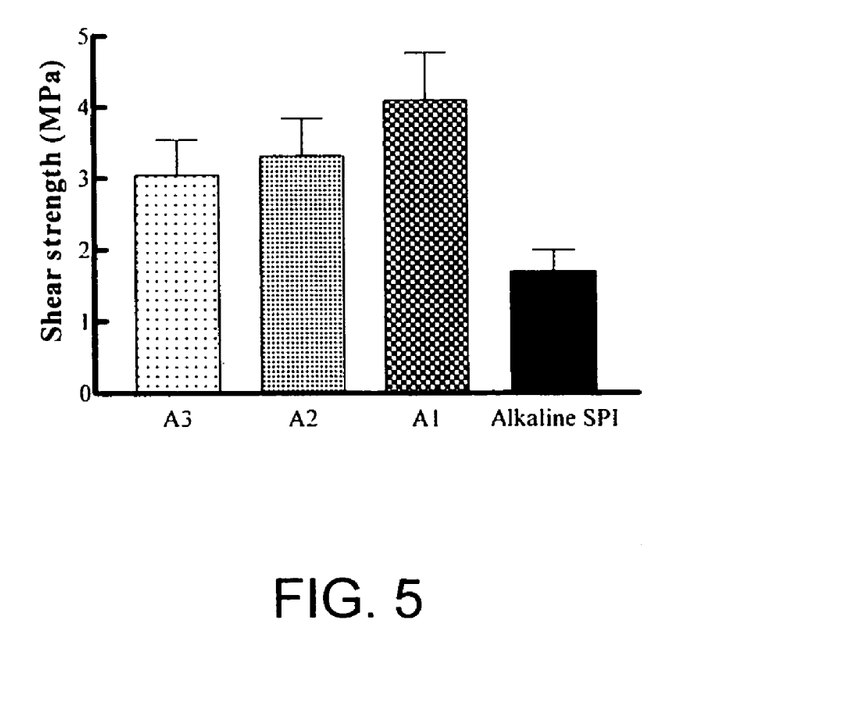
FIG. 5 is a graph depicting the lap-shear strength of an adhesive made according to the synthesis scheme shown in FIG. 4.

Maple veneer with a thickness of 0.6 mm was cut into pieces with the dimension of 7.5×12 cm. A glue mixture containing water/SPI-CA (6:1 weight ratio) was pasted to one side of the maple veneer samples. The adhesive-pasted area for each piece of veneer sample was 1.5×12 cm. The amount of glue was 2.5 mg/cm$^2$ (dry weight). Two pieces of adhesive-pasted veneer were lapped together and then pressed at 20 kg/cm$^2$ and 120° C. for 10 minutes. Subsequently, the plywood sample was cut into 6 specimens. Each specimen had a bond area of 2×1.5 cm$^2$. Lap-shear strengths of the resulting wood assembly specimens were tested as described above in Example 3. The results are shown in FIG. 5.

Having illustrated and described the principles of the disclosed compositions, methods and composites with reference to several embodiments, it should be apparent that these compositions, methods and composites may be modified in arrangement and detail without departing from such principles.

What is claimed is:

1. A lignocellulosic composite, comprising at least two lignocellulosic substrates bonded together with an adhesive composition, the adhesive composition comprising a reaction product of soy protein and at least one compound, wherein the at least one compound includes both (i) at least one first functional group selected from phenolic hydroxyl, thiol, amino, or imino, and (ii) at least one second functional group selected from hydroxyl, carboxyl or amino, wherein the adhesive composition includes a covalent bond formed between the second functional group of the at least one compound and the soy protein.

2. The composite of claim 1, wherein the first functional group comprises amino and the compound is selected from an alkyl amine, an unsaturated hydrocarbon amine, a hydroxy amine, an amidine, an imine, an amino acid, a polyamine, or a polyamide.

3. The composite of claim 1, wherein the soy protein is provided in the form of a soy protein product.

4. The composite of claim 3, wherein the soy protein product is selected from soy flour, soy protein concentrate, or soy protein isolate.

5. The composite of claim 4, wherein the soy protein product is soy flour.

6. The composite of claim 1, wherein the lignocellulosic composite comprises a particleboard, oriented strand board, waferboard, fiberboard, parallel strand lumber, laminated strand lumber, plywood or laminated veneer lumber.

7. A lignocellulosic composite, comprising at least two lignocellulosic substrates bonded together with an adhesive composition, the adhesive composition comprising the reaction product of soy protein with at least one compound under conditions sufficient for introducing additional functional groups into the soy protein structure, wherein the additional functional groups comprise at least one group selected from phenolic hydroxyl, amino, imino or thiol, and the additional functional groups are present in terminal, pendant, or terminal and pendant positions in the soy protein structure.

8. The composite of claim 7, wherein the lignocellulosic composite comprises a particleboard, oriented strand board, waferboard, fiberboard, parallel strand lumber, laminated strand lumber, plywood or laminated veneer lumber.

9. A lignocellulosic composite, comprising at least two lignocellulosic substrates bonded together with an adhesive composition, the adhesive composition comprising a reaction product of soy protein and a compound, wherein the compound includes (i) at least one first functional group selected from phenolic hydroxyl or thiol and (ii) at least one amino functional group, and the amino functional group of the compound covalently bonds to a carboxylic acid functional group of the soy protein.

10. The composite of claim 1, wherein the first functional group comprises amino and the compound is a hydroxy amine.

11. The composite of claim 1, wherein the first functional group comprises amino and the compound is a polyamine.

12. The composite of claim 1, wherein the first functional group comprises amino and the compound is a polyamide.

13. The composite of claim 1, wherein the second functional group comprises hydroxyl.

14. The composite of claim 1, wherein the first functional group comprises amino and the second functional group comprises hydroxyl.

15. The composite of claim 10, wherein the second functional group comprises hydroxyl.

16. The composite of claim 11, wherein the second functional group comprises hydroxyl.

17. The composite of claim 1, wherein the soy protein is initially reacted with the compound prior to bonding the two lignocellulosic substrates together.

18. An adhesive composition comprising a reaction product of soy protein and at least one compound, wherein the at least one compound includes both (i) at least one first functional group selected from phenolic hydroxyl, thiol, amino, or imino, and (ii) at least one second functional group for covalently bonding the at least one compound to the soy protein, wherein the second functional group is selected from hydroxyl or carboxyl.

19. The adhesive composition of claim 18, wherein the second functional group comprises hydroxyl.

20. The adhesive composition of claim 19, wherein the first functional group comprises amino.

21. The adhesive composition of claim 18, wherein the first functional group comprises amino and the compound is a polyamine.

22. The composite of claim 1, wherein the covalent bond formed between the second functional group and the soy protein is in the form of an amide, ether or ester linking group.

23. The composite of claim 1, wherein the covalent bond formed between the second functional group and the soy protein is in the form of an amide linking group.

24. The composite of claim 7, wherein the reaction product includes at least one amide, ether or ester linking group covalently bonding the soy protein with the at least one compound.

25. The composite of claim 7, wherein the reaction product includes at least one amide linking group covalently bonding the soy protein with the at least one compound.

26. The composite of claim 7, wherein the additional functional groups are covalently bonded to the soy protein via at least one amide, ether or ester linking group.

27. The composite of claim 7, wherein the additional functional groups are covalently bonded to the soy protein via at least one amide linking group.

28. The composite of claim 25, wherein the additional functional groups are selected from phenolic hydroxyl or thiol.

29. The composite of claim 27, wherein the additional functional groups are selected from phenolic hydroxyl or thiol.

30. The composite of claim 7, wherein the additional functional groups include phenolic hydroxyl groups and thiol groups.

31. An adhesive composition comprising a modified soy protein structure, wherein the modified soy protein structure includes at least one additional phenolic hydroxyl, amino, imino or thiol group relative to an un-modified soy protein structure, and the additional phenolic hydroxyl, amino, imino or thiol group is covalently bonded to the soy protein structure via an amide, ether or ester linking group.

32. The adhesive composition of claim 31, wherein the modified soy protein structure includes additional phenolic hydroxyl or thiol groups, and the additional phenolic hydroxyl or thiol groups are covalently bonded to the soy protein structure via an amide linking group.

33. The adhesive composition of claim 32, wherein the amide linking group is formed with a carboxyl group of the soy protein.

34. The adhesive composition of claim 31, wherein the modified soy protein structure includes at least one additional phenolic hydroxyl group and at least one additional amino group.

35. The adhesive composition of claim 31, wherein the modified soy protein structure includes at least one additional phenolic hydroxyl group and at least one additional thiol group.

* * * * *